(12) United States Patent
Yu et al.

(10) Patent No.: US 10,148,478 B2
(45) Date of Patent: Dec. 4, 2018

(54) APPARATUS AND METHOD FOR ESTIMATING CHANNEL IN WIRELESS LOCAL AREA NETWORK (WLAN) SYSTEM

(71) Applicant: Electronics and Telecommunications Research Institute, Daejeon (KR)

(72) Inventors: Chang Wahn Yu, Daejeon (KR); Hee Soo Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 293 days.

(21) Appl. No.: 14/581,967

(22) Filed: Dec. 23, 2014

(65) Prior Publication Data

US 2015/0188743 A1 Jul. 2, 2015

(30) Foreign Application Priority Data

Dec. 31, 2013 (KR) ........................ 10-2013-0168521

(51) Int. Cl.
*H04L 27/26* (2006.01)
*H04B 7/06* (2006.01)
*H04L 25/02* (2006.01)
*H04B 7/08* (2006.01)

(52) U.S. Cl.
CPC ....... *H04L 27/2627* (2013.01); *H04B 7/0671* (2013.01); *H04B 7/084* (2013.01); *H04L 25/0212* (2013.01); *H04L 25/0224* (2013.01); *H04L 27/2613* (2013.01); *H04L 27/2647* (2013.01); *H04L 27/2655* (2013.01)

(58) Field of Classification Search
CPC .................................................. H04L 27/2627
See application file for complete search history.

(56) References Cited

U.S. PATENT DOCUMENTS

| 8,494,075 B2 * | 7/2013 | Shi ...................... H04L 25/0204 |
| | | 375/267 |
| 2004/0081073 A1 * | 4/2004 | Walton ................. H04B 7/0669 |
| | | 370/204 |
| 2008/0212696 A1 * | 9/2008 | Takahashi ............. H04L 1/0045 |
| | | 375/260 |

(Continued)

FOREIGN PATENT DOCUMENTS

| KR | 10-2007-0098067 A | 10/2007 |
| KR | 10-2007-011734 A | 12/2007 |

(Continued)

OTHER PUBLICATIONS

Fan Zhang et al., "Optimum Receiver Antenna Selection for Transmit Cyclic Delay Diversity", 2008 IEEE International Conference on Communications, May 2008, pp. 3829-3833, Beijing.

*Primary Examiner* — Parth Patel (57) ABSTRACT

A method and apparatus for estimating a channel in a wireless local area network (WLAN) are provided. A channel estimation apparatus may include a channel estimation information combiner to combine at least one channel estimation information based on a difference between cyclic delay diversity (CDD) values, and a phase applier to generate a first phase value and to apply the first phase value to the combined channel estimation information.

18 Claims, 5 Drawing Sheets

(56) References Cited

U.S. PATENT DOCUMENTS

| | | | | |
|---|---|---|---|---|
| 2010/0046656 A1* | 2/2010 | van Nee | ............... | C08F 214/18 375/267 |
| 2010/0091896 A1* | 4/2010 | Lee | ............ | H04B 7/12 375/260 |
| 2010/0189167 A1* | 7/2010 | Pare, Jr. | ................ | H04L 5/0007 375/219 |
| 2010/0260159 A1* | 10/2010 | Zhang | ................... | H04W 28/06 370/338 |
| 2011/0188559 A1* | 8/2011 | Van Nee | ............... | H04L 5/0023 375/226 |
| 2011/0211594 A1* | 9/2011 | Van Nee | ............ | H04J 13/0003 370/475 |
| 2011/0255620 A1* | 10/2011 | Jones, IV | ............ | H04L 5/0046 375/260 |
| 2011/0280232 A1* | 11/2011 | Wu | ........................ | H04W 28/06 370/338 |
| 2011/0305194 A1* | 12/2011 | Zheng | ................. | H04B 7/0452 370/328 |
| 2012/0008643 A1* | 1/2012 | Zhang | ................. | H04B 7/0671 370/474 |
| 2012/0014336 A1* | 1/2012 | Seok | ..................... | H04L 5/0007 370/329 |
| 2012/0051454 A1* | 3/2012 | Zheng | ................... | H04L 5/0048 375/295 |
| 2012/0051476 A1* | 3/2012 | Shi | ...................... | H04L 25/0204 375/359 |
| 2012/0127940 A1* | 5/2012 | Lee | ....................... | H04L 5/0023 370/329 |
| 2012/0128094 A1* | 5/2012 | Nakao | .................. | H04B 7/0671 375/295 |
| 2013/0107912 A1* | 5/2013 | Ponnampalam | .... | H04L 27/0008 375/147 |
| 2013/0128807 A1* | 5/2013 | Vermani | ............... | H04L 5/0053 370/328 |
| 2013/0229996 A1* | 9/2013 | Wang | ............... | H04W 72/0413 370/329 |
| 2013/0242768 A1* | 9/2013 | Li | ........................ | H04B 7/0671 370/252 |
| 2015/0103799 A1* | 4/2015 | Seok | ..................... | H04L 5/0007 370/329 |
| 2015/0139099 A1* | 5/2015 | Lee | ....................... | H04W 72/00 370/329 |
| 2015/0139205 A1* | 5/2015 | Kenney | ............... | H04W 52/241 370/338 |

FOREIGN PATENT DOCUMENTS

| | | |
|---|---|---|
| KR | 10-2008-0032588 A | 4/2008 |
| KR | 10-2013-0010487 A | 1/2013 |
| WO | WO 2011/130473 A1 | 10/2011 |

\* cited by examiner

APPARATUS AND METHOD FOR ESTIMATING CHANNEL IN WIRELESS LOCAL AREA NETWORK (WLAN) SYSTEM

CROSS-REFERENCE TO RELATED APPLICATION

This application claims the benefit of Korean Patent Application No. 10-2013-0168521, filed on Dec. 31, 2013, in the Korean Intellectual Property Office, the disclosure of which is incorporated herein by reference.

BACKGROUND

1. Field of the Invention

Embodiments of the present invention relate to a technology for estimating a channel when a cyclic delay diversity (CDD) transmission scheme is used in a system employing a wireless local area network (WLAN).

2. Description of the Related Art

A plurality of access points (APs) may be connected to each other via a network. In an AP, a plurality of stations (STAs) in a basic service set (BSS) may individually or simultaneously perform reception and transmission. In an independent basic service set (IBSS), a single STA may perform reception and transmission with each or all of a plurality of STAs.

Each STA may include a transmitter and a receiver. Among transmission signals simultaneously transmitted by STAs, a transmission signal may be transmitted using a multiple-input and multiple-output (MIMO) communication channel by a transmitter of an STA, and another transmission signal may be transmitted using an identity matrix by a transmitter of an STA that does not use channel information. Additionally, a transmitter of an STA that uses channel information may determine a weight vector based on the channel information, and may determine STAs that are to simultaneously transmit transmission signals, and a number of the STAs.

Additionally, a receiver of an STA may reconstruct data transmitted through a process, for example, digital conversion, carrier sensing, discrete Fourier transform (DFT), and the like.

SUMMARY

According to an aspect of the present invention, there is provided a channel estimation apparatus, including: a channel estimation information combiner to combine at least one channel estimation information based on a difference between cyclic delay diversity (CDD) values; and a phase applier to generate a first phase value and to apply the first phase value to the combined channel estimation information.

The at least one channel estimation information may include at least one of non-high throughput (HT)-long training field (LTF) channel estimation information and very high throughput (VHT)-LTF channel estimation information.

The non-HT-LTF channel estimation information may include a received complex storage value of a non-HT-LTF passing through a wireless channel.

The received complex storage value of the non-HT-LTF may be obtained by reflecting at least one of a number of subcarriers of an orthogonal frequency-division multiplexing (OFDM) symbol, an index of a subcarrier of the OFDM symbol, and a CDD value of a transmission antenna of a non-HT field to a wireless channel value transmitted via a transmission antenna.

The VHT-LTF channel estimation information may include a received complex storage value of a VHT-LTF passing through a wireless channel.

The received complex storage value of the VHT-LTF may be obtained by reflecting at least one of a number of subcarriers of an OFDM symbol, an index of a subcarrier of the OFDM symbol, and a CDD value of a transmission antenna of a VHT field to a wireless channel value transmitted via a transmission antenna.

The phase applier may generate the first phase value, based on a difference between a CDD value of a transmission antenna of a non-HT field and a CDD value of a transmission antenna of a VHT field.

The phase applier may generate the first phase value, based on at least one of a number of subcarriers of an OFDM symbol and an index of a subcarrier of the OFDM symbol.

The channel estimation apparatus may further include a final channel estimation value calculator to generate a second phase value, to reflect the second phase value and an output of the phase applier to the non-HT-LTF channel estimation information, to add the VHT-LTF channel estimation information to the non-HT-LTF channel estimation information, and to calculate a final channel estimation value.

The final channel estimation value calculator may generate the second phase value, based on a difference between a CDD value of a transmission antenna of a non-HT field and a CDD value of a transmission antenna of a VHT field.

The final channel estimation value calculator may generate the second phase value, based on at least one of a number of subcarriers of an OFDM symbol and an index of a subcarrier of the OFDM symbol.

According to another aspect of the present invention, there is provided a channel estimation method, including: combining, by a channel estimation information combiner, at least one channel estimation information based on a difference between CDD values; generating, by a phase applier, a first phase value; and applying, by the phase applier, the first phase value to the combined channel estimation information. The at least one channel estimation information may include at least one of non-HT-LTF channel estimation information and VHT-LTF channel estimation information.

The non-HT-LTF channel estimation information may include a received complex storage value of a non-HT-LTF passing through a wireless channel.

The received complex storage value of the non-HT-LTF may be obtained by reflecting at least one of a number of subcarriers of an OFDM symbol, an index of a subcarrier of the OFDM symbol, and a CDD value of a transmission antenna of a non-HT field to a wireless channel value transmitted via a transmission antenna.

The VHT-LTF channel estimation information may include a received complex storage value of a VHT-LTF passing through a wireless channel.

The received complex storage value of the VHT-LTF may be obtained by reflecting at least one of a number of subcarriers of an OFDM symbol, an index of a subcarrier of the OFDM symbol, and a CDD value of a transmission antenna of a VHT field to a wireless channel value transmitted via a transmission antenna.

The generating may include generating the first phase value, based on a difference between a CDD value of a transmission antenna of a non-HT field and a CDD value of a transmission antenna of a VHT field.

The generating may include generating the first phase value, based on at least one of a number of subcarriers of an OFDM symbol and an index of a subcarrier of the OFDM symbol.

The channel estimation method may further include generating, by a final channel estimation value calculator, a second phase value, reflecting the second phase value and an output of the phase applier to the non-HT-LTF channel estimation information, adding the VHT-LTF channel estimation information to the non-HT-LTF channel estimation information, and calculating a final channel estimation value.

The generating of the second phase value may include generating the second phase value, based on at least one of a difference between a CDD value of a transmission antenna of a non-HT field and a CDD value of a transmission antenna of a VHT field, a number of subcarriers of an OFDM symbol and an index of a subcarrier of the OFDM symbol.

EFFECT

According to embodiments of the present invention, it is possible to increase a reliability of wireless channel estimation by combining channel information based on a cyclic delay diversity (CDD) value of a non-high throughput (HT)-long training field (LTF) and a CDD value of a very high throughput (VHT)-LTF.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
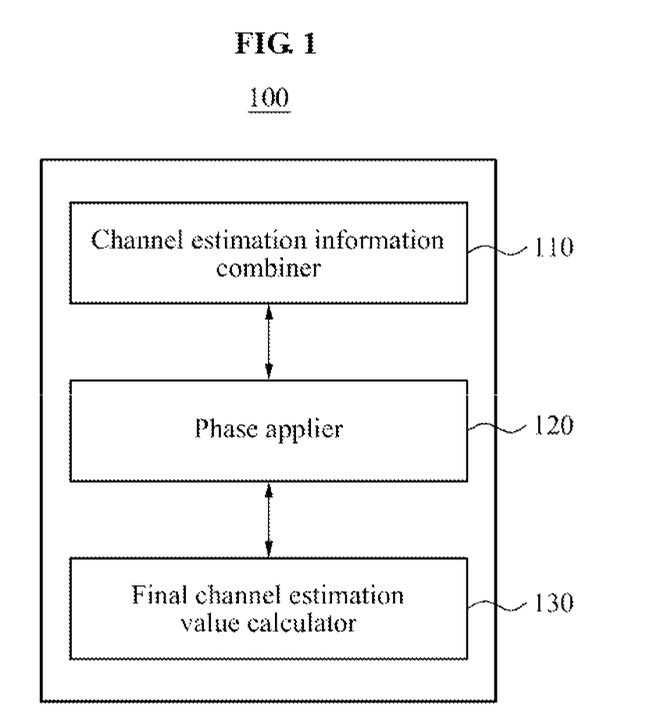
FIG. 1 is a block diagram illustrating a channel estimation apparatus according to an embodiment.

FIG. 1 is a block diagram illustrating a channel estimation apparatus 100 according to an embodiment.

When a cyclic delay diversity (CDD) transmission scheme is used in a system employing a wireless local area network (WLAN), the channel estimation apparatus 100 of FIG. 1 may estimate a channel. To estimate the channel, the channel estimation apparatus 100 may enhance a system performance based on channel estimation, by combining wireless channel information based on a CDD value.

Referring to FIG. 1, the channel estimation apparatus 100 may include a channel estimation information combiner 110, a phase applier 120, and a final channel estimation value calculator 130.

The channel estimation information combiner 110 may combine at least one channel estimation information based on a difference between CDD values. The at least one channel estimation information may include, for example, at least one of non-high throughput (HT)-long training field (LTF) channel estimation information and very high throughput (VHT)-LTF channel estimation information.

The following description of embodiments of the present invention is given using non-HT-LTF channel estimation information or VHT-LTF channel estimation information as at least one channel estimation information, however, there is no limitation thereto. Accordingly, a variety of channel estimation information may be applied.

The channel estimation apparatus 100 may estimate a channel based on non-HT-LTF channel estimation information and VHT-LTF channel estimation information. The non-HT-LTF channel estimation information may include a received complex storage value of a non-HT-LTF, and the VHT-LTF channel estimation information may include a received complex storage value of a VHT-LTF passing through a wireless channel. For example, the channel estimation information combiner 110 may output a value obtained by adding up the received complex storage value of the non-HT-LTF and the received complex storage value of the VHT-LTF, as combined channel estimation information.

The received complex storage value of the non-HT-LTF may include a complex value obtained by reflecting at least one of a number of subcarriers of an orthogonal frequency-division multiplexing (OFDM) symbol, an index of a subcarrier of the OFDM symbol, and a CDD value of a transmission antenna of a non-HT field to a wireless channel value transmitted via the transmission antenna. The received complex storage value of the VHT-LTF may include a complex value obtained by reflecting at least one of a number of subcarriers of an OFDM symbol, an index of a subcarrier of the OFDM symbol, and a CDD value of a transmission antenna of a VHT field to a wireless channel value transmitted via the transmission antenna.

The phase applier 120 may generate a first phase value, and may apply the first phase value to the combined channel estimation information. The phase applier 120 may multiply a first phase value generated by a phase generator by combined channel estimation information, to apply the first phase value to the combined channel estimation information. In an example, the phase applier 120 may generate a first phase value, based on a difference between a CDD value of a transmission antenna of a non-HT field and a CDD value of a transmission antenna of a VHT field. In another example, the phase applier 120 may generate a first phase value, based on at least one of a number of subcarriers of an OFDM symbol and an index of a subcarrier of the OFDM symbol.

The channel estimation apparatus 100 may further include a final channel estimation value calculator 130.

The final channel estimation value calculator 130 may generate a second phase value, may reflect the second phase value and an output of the phase applier 120 to the non-HT-LTF channel estimation information, may add the VHT-LTF channel estimation information to the non-HT-LTF channel estimation information, and may calculate a final channel estimation value. In an example, the final channel estimation value calculator 130 may generate a second phase value, based on a difference between a CDD value of a transmission antenna of a non-HT field and a CDD value of a transmission antenna of a VHT field. In another example, the final channel estimation value calculator 130 may generate a second phase value, based on at least one of a number of subcarriers of an OFDM symbol and an index of a subcarrier of the OFDM symbol.

Figure 2:
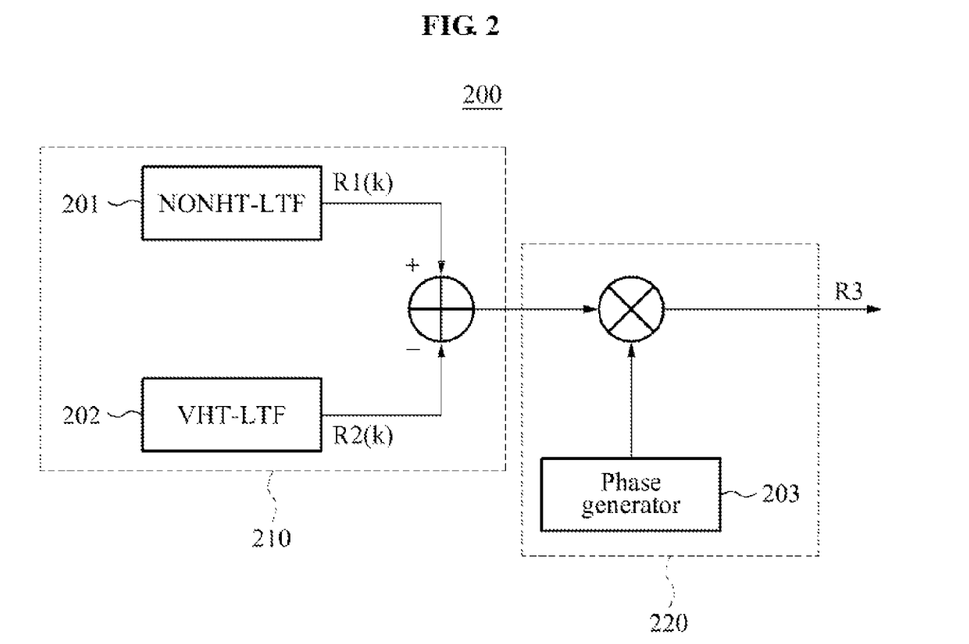
FIG. 2 is a diagram illustrating a structure of a channel estimation apparatus in which channel information is combined according to an embodiment.

FIG. 2 is a diagram illustrating a structure of a channel estimation apparatus 200 in which channel information is combined according to an embodiment.

When a CDD transmission scheme is used in a system employing a WLAN, the channel estimation apparatus 200 of FIG. 2 may estimate a channel. To estimate a channel, the channel estimation apparatus 200 may enhance a whole system performance of a wireless network by combining wireless channel information based on a CDD value.

To this end, the channel estimation apparatus 200 may combine channel information based on a CDD value of non-HT-LTF channel estimation information and a CDD value of VHT-LTF channel estimation information.

Referring to FIG. 2, a channel estimation information combiner 210 included in the channel estimation apparatus 200 may combine a received complex storage value 201 of a non-HT-LTF and a received complex storage value 202 of a VHT-LTF as channel estimation information. The non-HT-LTF and the VHT-LTF may each pass through a wireless channel.

The received complex storage value 201 denoted by R1(k) may be represented by Equation 1 below.

$$R1(k) = H1(k) + H2(k)\exp\left(j\frac{2\pi ka}{N}\right) \quad \text{[Equation 1]}$$

In Equation 1, H1(k) denotes a wireless channel value transmitted via a first transmission antenna, and H2(k) denotes a wireless channel value transmitted via a second transmission antenna. Additionally, N denotes a number of subcarriers of an OFDM symbol, k denotes an index of a subcarrier of the OFDM symbol, and a denotes a CDD value of a second transmission antenna of a non-HT field.

Additionally, the received complex storage value 202 denoted by R2(k) may be represented by Equation 2 below.

$$R2(k) = H1(k) + H2(k)\exp\left(j\frac{2\pi kb}{N}\right) \quad \text{[Equation 2]}$$

In Equation 2, H1(k) denotes a wireless channel value transmitted via a first transmission antenna, and H2(k) denotes a wireless channel value transmitted via a second transmission antenna. Additionally, N denotes a number of subcarriers of an OFDM symbol, k denotes an index of a subcarrier of the OFDM symbol, and b denotes a CDD value of a second transmission antenna of a VHT field.

To estimate a wireless channel value transmitted via a second transmission antenna, a phase applier 220 may generate a first phase value using a phase generator 203. The phase generator 203 may calculate S(k) as a first phase value using Equation 3 shown below.

$$S(k) = \frac{1}{2 + 2\cos\left(\frac{2\pi k(b-a)}{N}\right)}\left(1 - \exp\left(-j\frac{2\pi k(b-a)}{N}\right)\right) \quad \text{[Equation 3]}$$

In Equation 3, N denotes a number of subcarriers of an OFDM symbol, k denotes an index of a subcarrier of an OFDM symbol, a denotes a CDD value of a second transmission antenna of a non-HT field, and b denotes a CDD value of a second transmission antenna of a VHT field.

The phase applier 220 may reflect the first phase value generated using the phase generator 203 to at least one channel estimation information combined by the channel estimation information combiner 210. For example, the phase applier 220 may multiply the first phase value and the combined at least one channel estimation information, and may output R3(k) using Equation 4 shown below.

$$R3(k) = H2(k)\exp\left(j\frac{2\pi ka}{N}\right) \quad \text{[Equation 4]}$$

In Equation 4, H2(k) denotes a wireless channel value transmitted via a second transmission antenna. Additionally, N denotes a number of subcarriers of an OFDM symbol, k denotes an index of a subcarrier of the OFDM symbol, and a denotes a CDD value of a second transmission antenna of a non-HT field.

Figure 3:
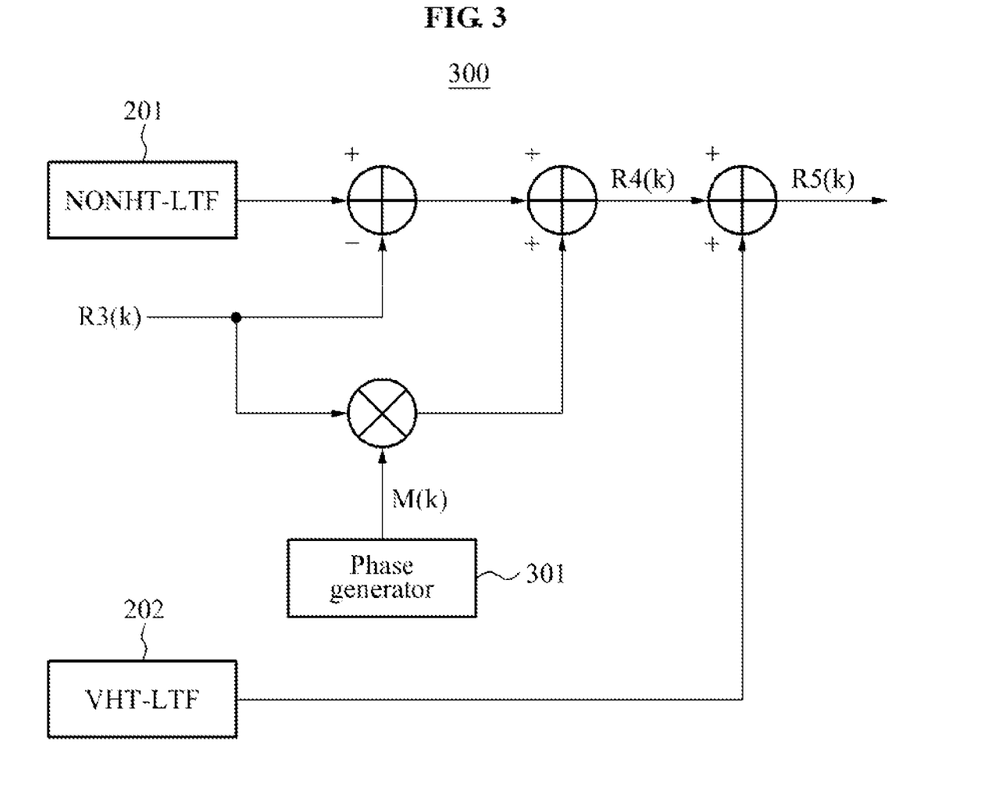
FIG. 3 is a diagram illustrating a channel estimation information combiner channel estimation value calculator to calculate a final channel estimation value according to an embodiment.

FIG. 3 illustrates a channel estimation information combiner 300 to calculate a final channel estimation value according to an embodiment. Referring to FIG. 3, in a structure of the channel estimation information combiner 300, a final channel estimation value may be calculated based on R3(k) output from the phase applier 220 of FIG. 2.

The channel estimation information combiner 300 may compute R4(k), based on the received complex storage value 201, the received complex storage value 202 calculated using Equation 2, and a second phase value generated by a phase generator 301. For example, the channel estimation information combiner 300 may output R4(k) by compensating for a non-HT delay estimation value and a wireless channel value transmitted via a second antenna in a non-HT-LTF reception signal, and by compensating for a VHT delay value and a wireless channel value transmitted via a second antenna of a VHT-LTF.

The channel estimation information combiner 300 may compute a second phase value denoted by M(k) using Equation 5 below.

$$M(k) = H2(k)\exp\left(j\frac{2\pi k(b-a)}{N}\right) \quad \text{[Equation 5]}$$

In Equation 5, H2(k) denotes a wireless channel value transmitted via a second transmission antenna, N denotes a number of subcarriers of an OFDM symbol, and k denotes an index of a subcarrier of the OFDM symbol. Additionally, a denotes a CDD value of a second transmission antenna of a non-HT field, and b denote a CDD value of a second transmission antenna of a VHT field.

The channel estimation information combiner 300 may compute a final output R5(k) by reflecting the received complex storage value 202 to the computed R4(k). For example, the channel estimation information combiner 300 may add a non-HT-LTF channel estimation value and a VHT LTF channel estimation value, and may compute the final output R5(k). In the non-HT-LTF channel estimation value and the VHT LTF channel estimation value, CDD values may be compensated for.

Figure 4:
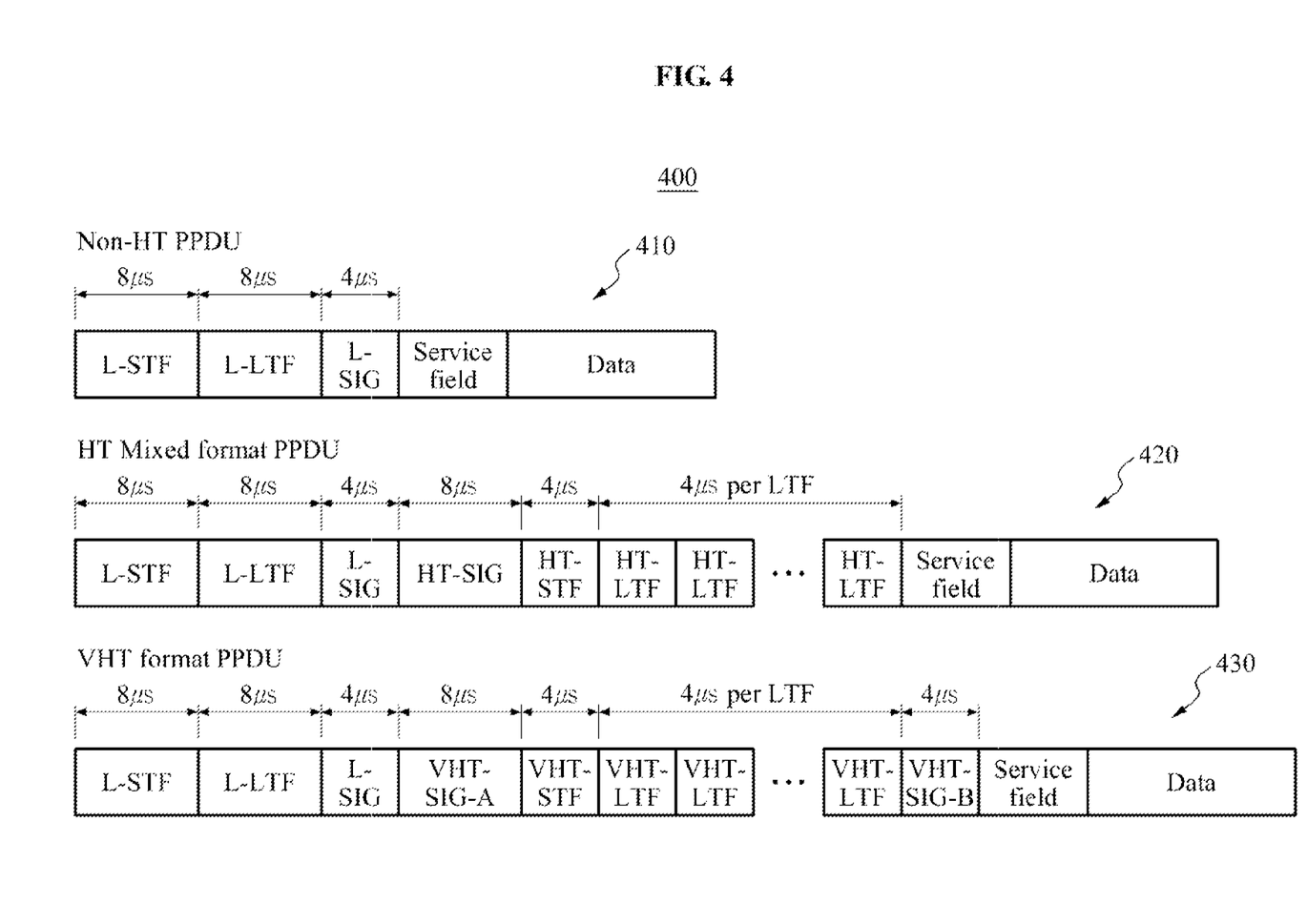
FIG. 4 is a diagram illustrating a data transmission structure for multi-user transmission.

FIG. 4 is a diagram illustrating a data transmission structure 400 for multi-user transmission.

A channel estimation apparatus according to an embodiment of the present invention may be applied to a VHT WLAN physical layer frame structure field 410 of FIG. 4 based on the Institute of Electrical and Electronics Engineers (IEEE) 802.11ac.

A WLAN system may have a structure of a first frame 410 of FIG. 4. The first frame 410 may have a structure of a non-HT format presentation protocol data unit (PPDU) based on the IEEE 802.11a/g, and a second frame 420 may have a structure of an HT format PPDU based on the IEEE 802.11n. Additionally, a third frame 430 may have a structure of a VHT format PPDU based on the IEEE 802.11ac. For backward compatibility, all of the non-HT format PPDU, the HT format PPDU and the VHT format PPDU in the WLAN system may have the same frame structures, that is, the same L-short training field (STF), the same L-LTF, and the same legacy signal (L-SIG). Additionally, the WLAN system may transmit an HT-SIG after an L-SIG to HT mode stations, and may transmit a VHT-SIG-A and a VHT-SIG-B after an L-SIG to VHT mode stations. The above signal field may use a channel code rate of 1/2, and a binary phase-shift keying (BPSK) based on a set number of bits.

An L-LTF may be a training sequence for wireless channel estimation of an L-SIG signal and a VHT-SIG-A signal, and may use a BPSK signal as a modulation scheme. A VHT-LTF may be a training sequence for wireless channel estimation of a VHT-SIG-B signal, and may use a BPSK signal as a modulation scheme.

Each of an L-SIG, a VHT-SIG-A, and VHT-SIG-B may be a control signal to demodulate an IEEE 802.11ac WLAN physical layer, and may use a BPSK signal as a modulation scheme.

To reduce correlativity between antennas and an undesirable beamforming effect, each of the antennas may perform a CDD based on different delays. Additionally, a non-HT-LTF and a VHT-LTF used to estimate a channel may be transmitted based on different delay values. A channel estimation value of the non-HT-LTF and a channel estimation value of the VHT-LTF may be combined based on a difference between the delay values and accordingly, reliability of channel estimation may be increased.

Figure 5:
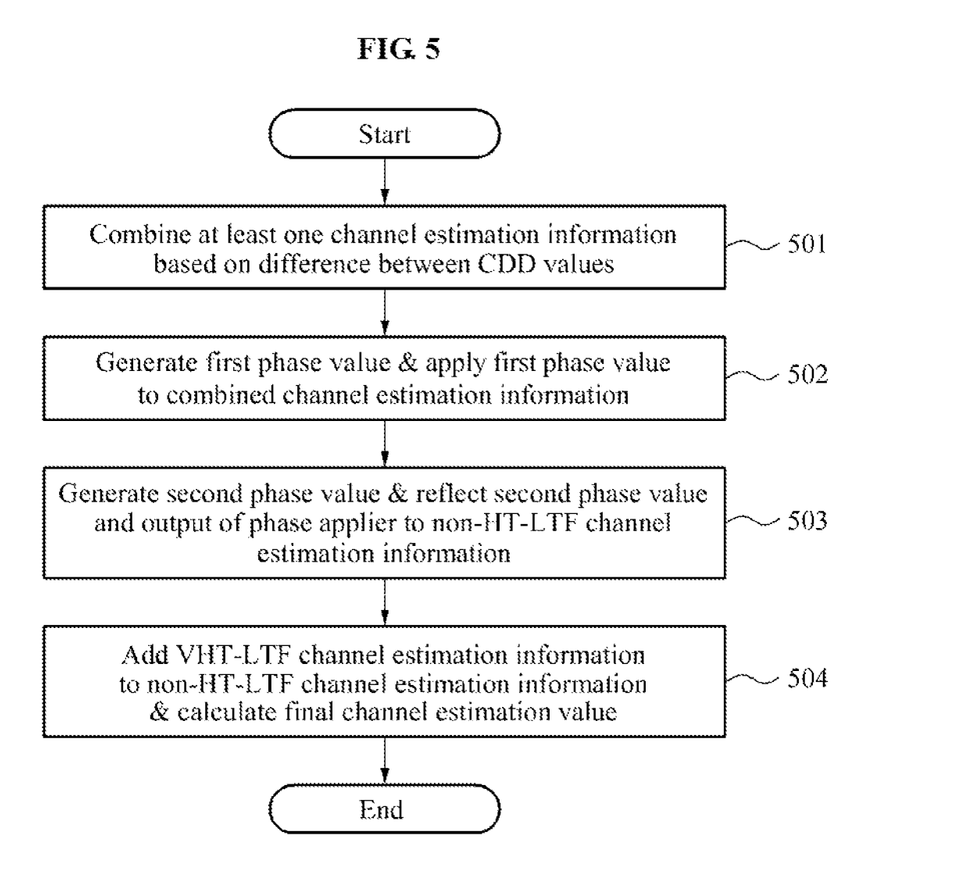
FIG. 5 is a flowchart illustrating a channel estimation method according to an embodiment.

FIG. 5 is a flowchart illustrating a channel estimation method according to an embodiment.

Referring to FIG. 5, in operation 501, the channel estimation method may combine at least one channel estimation information based on a difference between CDD values. For example, the at least one channel estimation information may include at least one of non-HT-LTF channel estimation information and VHT-LTF channel estimation information.

In operation 502, the channel estimation method may generate a first phase value, and may apply the first phase value to the combined channel estimation information. For example, the channel estimation method may generate a first phase value, based on a difference between a CDD value of a transmission antenna of a non-HT field and a CDD value of a transmission antenna of a VHT field. In another example, the channel estimation method may generate a first phase value, based on at least one of a number of subcarriers of an OFDM symbol and an index of a subcarrier of the OFDM symbol.

In operation 503, the channel estimation method may generate a second phase value, and may reflect an output of a phase applier and the second phase value to non-HT-LTF channel estimation information. In operation 504, the channel estimation method may add VHT-LTF channel estimation information to the non-HT-LTF channel estimation information, and may calculate a final channel estimation value.

For example, the channel estimation method may generate a second phase value, based on at least one of a difference between a CDD value of a transmission antenna of a non-HT field and a CDD value of a transmission antenna of a VHT field, a number of subcarriers of an OFDM symbol, and an index of a subcarrier of the OFDM symbol.

According to embodiments of the present invention, channel information may be combined based on a CDD value of a non-HT-LTF and a CDD value of a VHT-LTF in channel estimation and thus, it is possible to increase reliability of wireless channel estimation.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A channel estimation apparatus of an access point (AP), comprising:
 a channel estimation information combiner to combine non-high throughput (HT)-long training field (LTF) channel estimation information and very high throughput (VHT)-LTF channel estimation information based on a difference between a cyclic delay diversity (CDD) value of the non-HT-LTF and a CDD value of the VHT-LTF;
 a phase applier to generate a first phase value and to apply the first phase value to the combined channel estimation information; and
 a final channel estimation value calculator to generate a second phase value, to reflect the second phase value and an output of the phase applier to the non-HT-LTF channel estimation information, to add the VHT-LTF channel estimation information to the non-HT-LTF channel estimation information, and to calculate a final channel estimation value wherein the AP uses the final channel estimation value to determine a number of stations (STAs) to which signals are simultaneously transmitted, and simultaneously transmits the signals to the STAs.

2. The channel estimation apparatus of claim 1, wherein the non-HT-LTF channel estimation information comprises a received complex storage value of a non-HT-LTF passing through a wireless channel.

3. The channel estimation apparatus of claim 2, wherein the received complex storage value of the non-HT-LTF is obtained by reflecting at least one of a number of subcarriers of an orthogonal frequency-division multiplexing (OFDM) symbol, an index of a subcarrier of the OFDM symbol, and a CDD value of a transmission antenna of a non-HT field to a wireless channel value transmitted via a transmission antenna.

4. The channel estimation apparatus of claim 1, wherein the VHT-LTF channel estimation information comprises a received complex storage value of a VHT-LTF passing through a wireless channel.

5. The channel estimation apparatus of claim 4, wherein the received complex storage value of the VHT-LTF is obtained by reflecting at least one of a number of subcarriers of an OFDM symbol, an index of a subcarrier of the OFDM symbol, and a CDD value of a transmission antenna of a VHT field to a wireless channel value transmitted via a transmission antenna.

6. The channel estimation apparatus of claim 1, wherein the phase applier generates the first phase value, based on a difference between a CDD value of a transmission antenna of a non-HT field and a CDD value of a transmission antenna of a VHT field.

7. The channel estimation apparatus of claim 1, wherein the phase applier generates the first phase value, based on at least one of a number of subcarriers of an OFDM symbol and an index of a subcarrier of the OFDM symbol.

8. The channel estimation apparatus of claim 1,
wherein the final channel estimation value calculator generates the second phase value, based on a difference between a CDD value of a transmission antenna of a non-HT field and a CDD value of a transmission antenna of a VHT field.

9. A channel estimation apparatus of an access point (AP) comprising:
a channel estimation information combiner to combine non-high throughput (HT)-long training field (LTF) channel estimation information and very high throughput (VHT)-LTF channel estimation information based on a difference between a cyclic delay diversity (CDD) value of the non-HT-LTF and a CDD value of the VHT-LTF; and
a phase applier to generate a first phase value and to apply the first phase value to the combined channel estimation information,
a final channel estimation value calculator to calculate a final channel estimation value based on at least one of the non-HT LTF channel estimation information, a second phase value, an output of the phase applier, and the VHT-LTF channel estimation information,
wherein the final channel estimation value calculator generates the second phase value, based on at least one of a number of subcarriers of an OFDM symbol and an index of a subcarrier of the OFDM symbol,
wherein the AP uses the final channel estimation value to determine a number of stations (STAs) to which signals are simultaneously transmitted, and simultaneously transmits the signals to the STAs.

10. A channel estimation method performed by an access point (AP), comprising:
combining, by a channel estimation information combiner, non-high throughput (HT)-long training field (LTF) channel estimation information and very high throughput (VHT)-LTF channel estimation information based on a difference between a cyclic delay diversity (CDD) value of the non-HT-LTF and a CDD value of the VHT-LTF;
generating, by a phase applier, a first phase value;
applying, by the phase applier, the first phase value to the combined channel estimation information;
calculating, by a final channel estimation value calculator, a second phase value, to reflect the second phase value and an output of the phase applier to the non-HT-LTF channel estimation information, to add the VHT-LTF channel estimation information to the non-HT-LTF channel estimation information, and to calculate a final channel estimation value; and
determining a number of stations (STAs) to which signals are simultaneously transmitted using the final channel estimation value; and
simultaneously transmitting the signals to the STAs.

11. The channel estimation method of claim 10, wherein the non-HT-LTF channel estimation information comprises a received complex storage value of a non-HT-LTF passing through a wireless channel.

12. The channel estimation method of claim 11, wherein the received complex storage value of the non-HT-LTF is obtained by reflecting at least one of a number of subcarriers of an orthogonal frequency-division multiplexing (OFDM) symbol, an index of a subcarrier of the OFDM symbol, and a CDD value of a transmission antenna of a non-HT field to a wireless channel value transmitted via a transmission antenna.

13. The channel estimation method of claim 10, wherein the VHT-LTF channel estimation information comprises a received complex storage value of a VHT-LTF passing through a wireless channel.

14. The channel estimation method of claim 13, wherein the received complex storage value of the VHT-LTF is obtained by reflecting at least one of a number of subcarriers of an OFDM symbol, an index of a subcarrier of the OFDM symbol, and a CDD value of a transmission antenna of a VHT field to a wireless channel value transmitted via a transmission antenna.

15. The channel estimation method of claim 10, wherein the generating comprises generating the first phase value, based on a difference between a CDD value of a transmission antenna of a non-HT field and a CDD value of a transmission antenna of a VHT field.

16. The channel estimation method of claim 10, wherein the generating comprises generating the first phase value, based on at least one of a number of subcarriers of an OFDM symbol and an index of a subcarrier of the OFDM symbol.

17. The channel estimation method of claim 10, further comprising:
generating, by the final channel estimation value calculator, the second phase value and reflecting the second phase value and the output of the phase applier to the non-HT-LTF channel estimation information, wherein the combining is adding the VHT-LTF channel estimation information to the non-HT-LTF channel estimation information.

18. The channel estimation apparatus of claim 17, wherein the generating of the second phase value comprises generating the second phase value, based on at least one of a difference between a CDD value of a transmission antenna of a non-HT field and a CDD value of a transmission antenna of a VHT field, a number of subcarriers of an OFDM symbol and an index of a subcarrier of the OFDM symbol.

* * * * *